United States Patent
Isonaga (10) Patent No.: US 9,601,282 B2
(45) Date of Patent: Mar. 21, 2017

(54) POWER SHUT-OFF UNIT

(75) Inventor: Taisuke Isonaga, Atsugi (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 483 days.

(21) Appl. No.: 14/115,714

(22) PCT Filed: Feb. 21, 2012

(86) PCT No.: PCT/JP2012/054079
§ 371 (c)(1),
(2), (4) Date: Nov. 5, 2013

(87) PCT Pub. No.: WO2012/153559
PCT Pub. Date: Nov. 15, 2012

(65) Prior Publication Data
US 2014/0077908 A1    Mar. 20, 2014

(30) Foreign Application Priority Data

May 10, 2011 (JP) .................................. 2011-104854

(51) Int. Cl.
*H01H 9/02* (2006.01)
*B60R 16/03* (2006.01)
(Continued)

(52) U.S. Cl.
CPC ............ *H01H 9/0271* (2013.01); *B60L 3/04* (2013.01); *B60R 16/0238* (2013.01); *B60R 16/03* (2013.01)

(58) Field of Classification Search
CPC ....... B60L 3/04; B60R 16/0238; B60R 16/03; H01H 9/0271
See application file for complete search history.

(56) References Cited

U.S. PATENT DOCUMENTS 5,911,588 A     6/1999   Kern
6,163,460 A *  12/2000   Baur ...................... H01G 2/04
                                                    361/752
(Continued)

FOREIGN PATENT DOCUMENTS

CN         1645996 A      7/2005
CN       201174356 Y     12/2008
(Continued)

OTHER PUBLICATIONS

Translation of Yagi JP 2006158133.*
Korean Office Action, Feb. 12, 2015, 3 pages.
Russian Decision on Grant, Dec. 8, 2014, 13 pages.

*Primary Examiner* — Rexford Barnie
*Assistant Examiner* — Elim Ortiz
(74) *Attorney, Agent, or Firm* — Foley & Lardner LLP (57) ABSTRACT

The power shut-off unit is equipped with two relays (2) connected to an external circuit, and a tabular baseplate (6). Multiple auxiliary electronic components (7) are mounted on the baseplate (6). The relays (2) are held so as to float over a mounting surface (13) via a pair of retaining members (8). A distance (d) equal to or greater than the thickness of the baseplate (6) is maintained between the relays (2) and the mounting surface (13). The baseplate (6) is not directly fixed to the mounting surface (13) and is connected to the relays (2) via multiple latching members (9). Because no load is acted upon the baseplate (6) by the relays (2), the baseplate (6) can be made thin.

11 Claims, 5 Drawing Sheets

(51) Int. Cl.
*B60R 16/023* (2006.01)
*B60L 3/04* (2006.01)

(56) References Cited

U.S. PATENT DOCUMENTS

| | | | |
|---|---|---|---|
| 7,923,866 B2 | 4/2011 | Ichikawa et al. | |
| 2005/0136705 A1* | 6/2005 | Kohlenberg | H02B 1/066 439/74 |
| 2007/0284167 A1 | 12/2007 | Watanabe et al. | |
| 2009/0122505 A1* | 5/2009 | Lu | H05K 1/0271 361/809 |

FOREIGN PATENT DOCUMENTS

| | | |
|---|---|---|
| CN | 201812749 U | 4/2011 |
| JP | 6-9325 U | 2/1994 |
| JP | 9-82193 A | 3/1997 |
| JP | 11-40035 A | 2/1999 |
| JP | 11-507469 A | 6/1999 |
| JP | 2006-158133 A | 6/2006 |
| JP | 2006-228526 A | 8/2006 |
| RU | 2024142 C1 | 11/1994 |
| RU | 2 054 219 C1 | 2/1996 |
| RU | 44 597 U1 | 3/2005 |
| RU | 2 383 449 C1 | 3/2010 |
| RU | 2408128 C1 | 12/2010 |

* cited by examiner

POWER SHUT-OFF UNIT

TECHNICAL FIELD

The present invention relates to a power shut-off unit that is used for an electric vehicle or the like.

BACKGROUND ART

A junction box which functions as a general power shut-off unit is provided in a power-source circuit of a battery. The junction box includes electronic components such as a relay(s) and a fuse(s) which conduct opening and closing (shut-off) of the power-source circuit and which distribute power among accessory components of a vehicle.

Patent Literature 1 discloses one example of the junction box. In this technique, when the electronic component has failed, only the electronic component can be checked and replaced easily, inexpensively and quickly in the course of using a battery.

In the case of the junction box disclosed in the Patent Literature 1, various electronic components and a relay for shutting off a power circuit are integrated with each other and are fastened to a battery frame. In this example, the plurality of electronic components are fixed to an inside of the junction box, and the relay is fixed to an upper surface of the junction box. This junction box itself is fixed to a lower case of the battery.

In an electric vehicle and the like, a large-size relay is used to deal with high voltages. In the technique disclosed in the Patent Literature 1, the relay having a heavy weight is provided on the upper surface of the junction box. Hence, there is a risk that a plate portion of the junction box on which the relay is mounted sags or bends resulting in rupture or breakage thereof due to a running vibration or the like of the vehicle. Therefore, it is necessary to thicken the plate portion in order to strengthen this plate portion. Accordingly, an unfavorable weight increase is caused.

CITATION LIST

Patent Literature

Patent Literature 1: Japanese Patent Application Publication No. 2006-228526

SUMMARY OF THE INVENTION

According to the present invention, a power shut-off unit includes a relay connected to an external circuit; a base plate formed in a tabular shape; and various electronic components except the relay (i.e., auxiliary electronic components), wherein the relay and the various electronic components are arranged above the base plate, wherein the relay is supported through a retaining member by a mounting surface such that a distance between the relay and the mounting surface is greater than or equal to a thickness of the base plate, wherein the base plate is connected with the relay by a latching member and is located between the relay and the mounting surface.

According to such a power shut-off unit, the relay and the auxiliary electronic component are arranged above the base plate. Hence, there is an advantage that the relay and/or the auxiliary electronic component can be checked and replaced easily, inexpensively and quickly when the relay and/or the auxiliary electronic component has failed. Moreover, a load of the relay having the heavy weight does not applied to the base plate, so that a required strength of the base plate can be lowered.

DETAILED DESCRIPTION OF INVENTION

Figure 2:
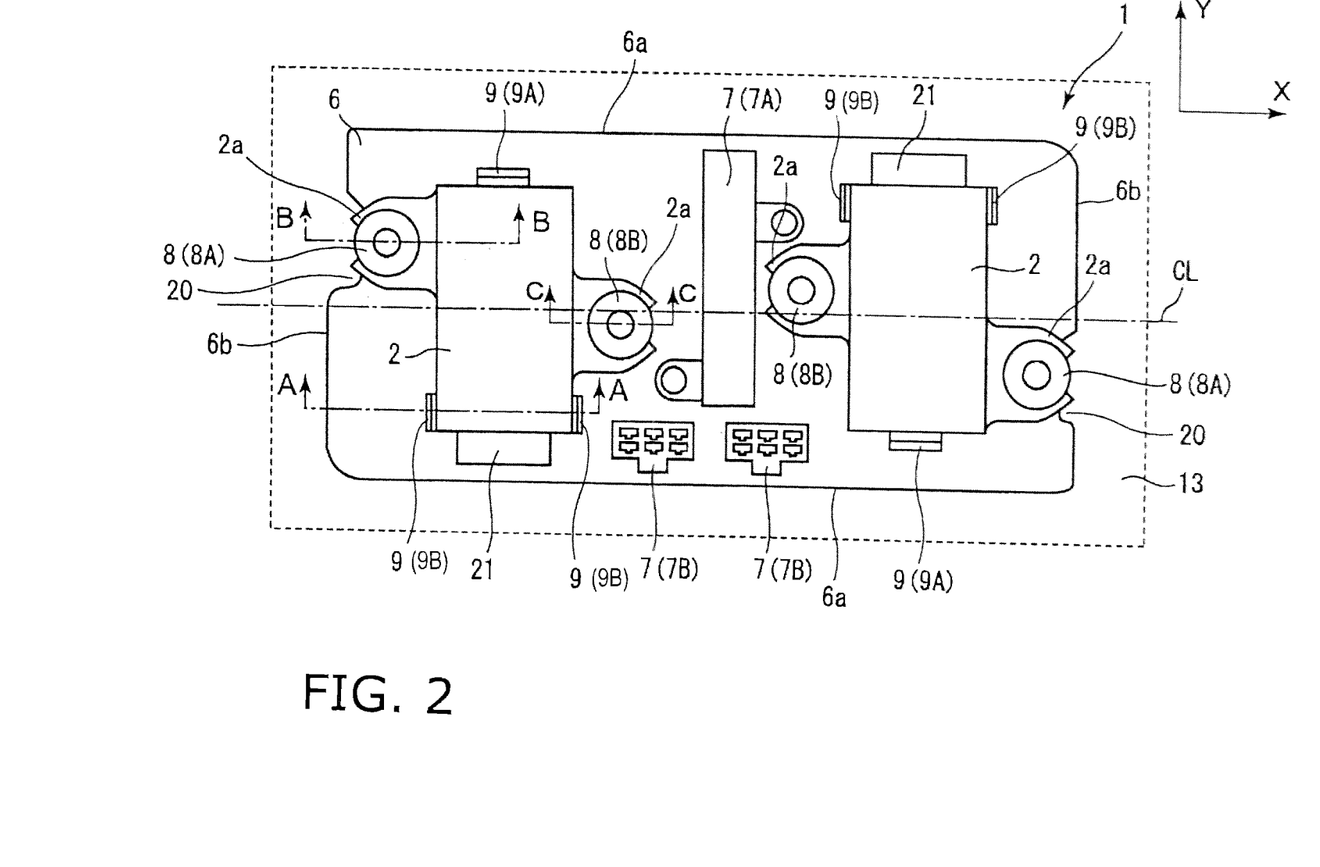
FIG. 2 A plan view showing a first embodiment of the power shut-off unit according to the present invention.
Figure 3:
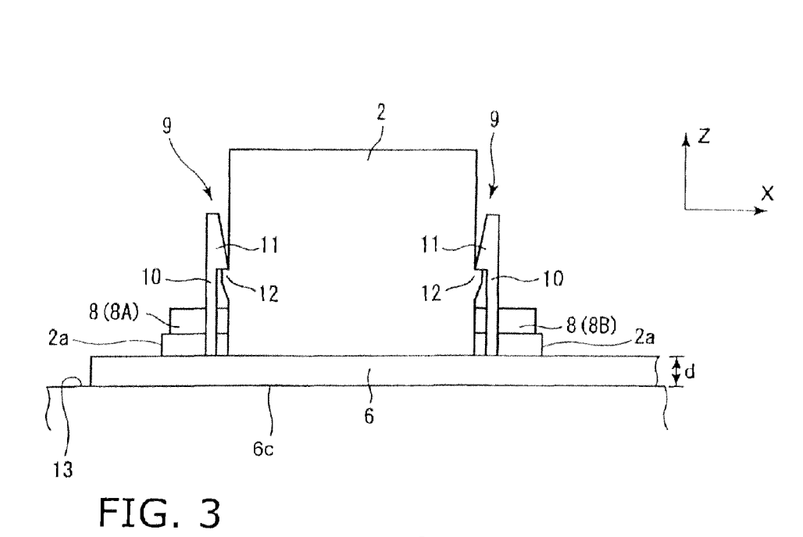
FIG. 3 A cross-sectional view of a part of the power shut-off unit, taken along a line A-A of FIG. 2.
Figure 4:
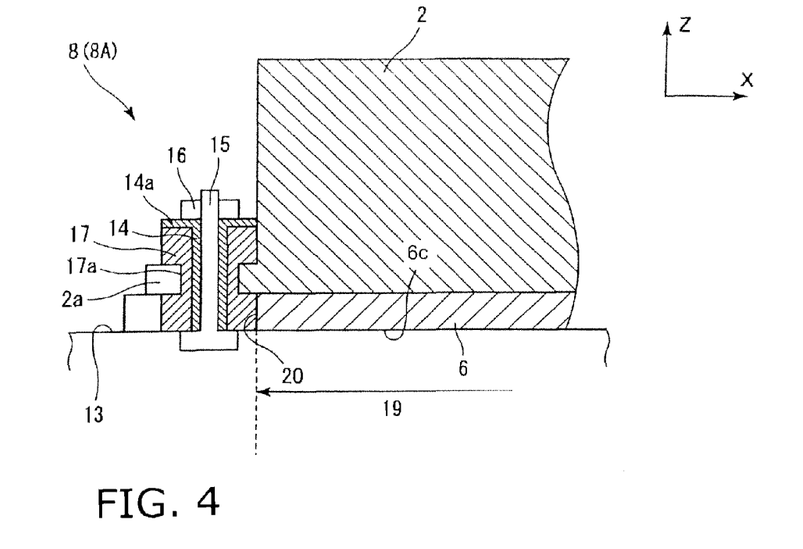
FIG. 4 A cross-sectional view of a part of the power shut-off unit, taken along a line B-B of FIG. 2.

Hereinafter, a first embodiment according to the present invention will be explained referring to FIGS. 1 to 4. In the respective figures, the same element has an identical reference sign, and thereby, the repetition of explanation thereof will be omitted. X-axis and Y-axis indicated in FIGS. 2 to 4 show mutually-perpendicular two directions that are along an after-mentioned mounting surface 13. Z-axis indicated in FIGS. 2 to 4 shows a direction perpendicular to the mounting surface 13.

Figure 1:
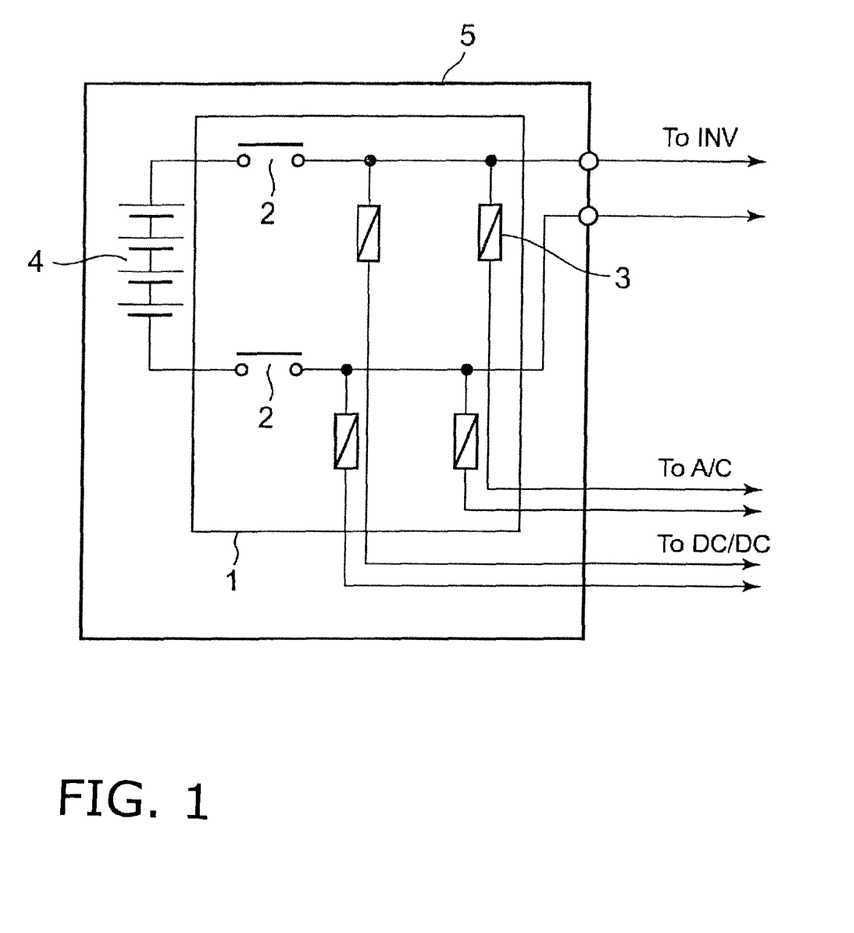
FIG. 1 An electric circuit diagram showing a part of a power-source circuit for an electric vehicle, in which a power shut-off unit is used.

FIG. 1 is an electric circuit diagram showing a part of a power-source circuit for an electric vehicle, in which a power shut-off unit 1 according to the present invention is used. The power shut-off unit 1 is provided in the power-source circuit as a part of a battery pack 5. The power shut-off unit 1 includes a relay(s) 2 and a fuse(s) 3. The power shut-off unit 1 functions as a breaker device which connects a battery 4 with an inverter (INV) and/or a DC-DC converter (DC/DC) and which disconnects the battery 4 from the inverter (INV) and/or the DC-DC converter (DC/DC), i.e. shuts off a power supply of the battery 4. It is noted that the battery 4 supplies power through the power shut-off unit 1 also to some accessory components of the vehicle, such as an air conditioner (A/C).

FIG. 2 is a plan view of the power shut-off unit 1 as viewed from above in the first embodiment (harness not shown). The power shut-off unit 1 is attached to the mounting surface 13 located inside a case of the battery pack 5. This battery pack 5 is, for example, mounted on a lower side of a floor of the electric vehicle.

The power shut-off unit 1 includes a base plate 6 formed in a rectangular plate shape. That is, the base plate 6 is in a tabular shape extending in the X-axis and Y-axis directions on X-Y plane. The base plate 6 includes a pair of side edges (boarders) 6a which are parallel to X-axis, and a pair of side edges (boarders) 6b which are parallel to Y-axis. The side edge 6a is longer than the side edge 6b so that the base plate 6 extends longer in the X-axis direction than in the Y-axis direction. The two relays 2 and a plurality of auxiliary electronic components 7 that are connected to an external circuit(s) are arranged on or above the base plate 6 so as to be collectively packaged as one unit. Therefore, when the relay 2 or the auxiliary electronic component 7 fails, an inspection and/or repair can be conducted easily, quickly and at low cost.

Each relay 2 can be used for high voltages, and is enclosed or sealed in a case formed in a rectangular-parallelepiped shape. As shown in FIG. 2, each relay 2 is disposed on the base plate 6 such that a longitudinal direction of the relay 2 accords with the Y-axis direction. A pair of bracket portions 2a are formed respectively at both the opposed side surfaces of the case of each relay 2. Each bracket portion 2a is constituted by an arm of the case of the relay 2, and is in a forked shape. The two bracket portions 2a of each relay 2 are located asymmetrically from each other.

Each relay 2 is supported by the mounting surface 13 through retaining members 8. Each retaining member 8 is formed substantially in a cylindrical-column shape. This retaining member 8 gives or defines a positional relation between the relay 2 and the mounting surface 13. Each retaining member 8 is attached to the bracket portion 2a of the relay 2. In each relay 2, the locations of the pair of bracket portions 2a, i.e. locations of the pair of retaining members 8 are asymmetrical as mentioned above, and are offset from each other with respect to the Y-axis direction. That is, when giving a reference sign 8A to the retaining member 8 of one side surface of the relay 2 and giving a reference sign 8B to the retaining member 8 of another side surface of the relay 2, the location of the retaining member 8A is shifted (offset) from the location of the retaining member 8B in the Y-axis direction as shown in FIG. 2. Since two fixing points at which the relay 2 is fixed to the mounting surface 13 are shifted (offset) from each other, a rotational moment of the relay 2 is restricted more effectively. Hence, each relay 2 is stably supported by the mounting surface 13. Moreover, since the retaining members 8A and 8B are provided on the side surfaces of the relay 2 which are parallel to the Y-axis direction, a length of the base plate 6 in the Y-axis direction can be shortened. Accordingly, an area (dimensions) of the base plate 6 can be made small.

The two relays 2 each including the bracket portions 2a fundamentally have the same structure as each other. As shown in FIG. 2, one of the two relays 2 is arranged to face in a direction opposite to a facing direction of another of the two relays 2, on the base plate 6. That is, the two relays 2 have postures opposite to each other.

The base plate 6 is supported by the relays 2 through a plurality of latching members (or locking members) 9. The plurality of latching members 9 are provided into the base plate 6. That is, the plurality of latching members 9 connects the base plate 6 with the relays 2. The base plate 6 is not directly fixed to the mounting surface 13.

As compared with the conventional structure in which the base plate is fixed to the mounting surface by four bolts provided at four corners of the base plate, the area of the base plate 6 can be made small because fastening portions by the bolts are unnecessary according to the present invention.

The auxiliary electronic components 7 include a resistor 7A and a harness connector portion(s) 7B and the like. The harness connector portion(s) 7B is continuous from the battery 4, the inverter and the accessory components and the like. At least two relays 2 each having the rectangular-parallelepiped shape are disposed to form a proper space between the at least two relays 2, and the auxiliary electronic components 7 are disposed between the adjacent two relays 2. Accordingly, the area of the base plate 6 can be reduced.

FIG. 3 is a cross-sectional view taken along a line A-A of FIG. 2 as viewed from a lateral direction of the power shut-off unit 1 in the first embodiment. As mentioned above, the relay 2 is supported through the retaining members 8 on the mounting surface 13. With respect to Z-axis direction, the retaining members 8 maintain a distance d between a bottom surface of the relay 2 and the mounting surface 13 at a value greater than or equal to a thickness of the base plate 6. As a result, a load of the relay 2 is not applied to the base plate 6. Hence, it is not necessary for the base plate 6 to support the load of each relay 2. Therefore, a necessary strength of the base plate 6 is lowered. In a more preferred embodiment, the distance d between the bottom surface of the relay 2 and the mounting surface 13 is set to be substantially equal to the thickness of the base plate 6 so that a lower surface 6c of the base plate 6 is substantially in contact with the mounting surface 13 as shown in the figures. Depending on circumstances, a minute clearance may be formed and kept between the lower surface 6c of the base plate 6 and the mounting surface 13.

According to the present invention, the strength necessary for the base plate 6 is lowered while the area of the base plate 6 is reduced. Hence, a weight reduction can be achieved. Therefore, it is unnecessary to fasten the base plate 6 to the relay 2 by means of bolt fastening. Instead, the base plate 6 can be held by the latching members 9. Each latching member 9 includes an arm portion 10 and a latching hook (locking claw) 11. The arm portion 10 extends from an upper surface of the base plate 6 in the Z-axis direction. The latching hook 11 is provided at a tip of the arm portion 10. In the first embodiment, the base plate 6 is made of synthetic resin, and each latching member 9 is molded integrally with the base plate 6. Engaging protrusions 12 are formed in side walls of the relay 2 at locations corresponding to the latching members 9. Each engaging protrusion 12 engages with the latching hook 11. That is, the latching hook 11 of the latching member 9 is engaged with the engaging protrusion 12 by means of elasticity of the arm portion 10, and thereby, the relay 2 and the babe plate 6 are connected (combined) with each other. Therefore, a connecting operation between the relays 2 and the base plate 6 becomes easy resulting in cost reduction.

The engaging protrusion 12 may be defined by a convex-concave normally existing in an outer surface of the relay 2. For example, the latching hook 11 may be hooked directly on an upper surface of the relay 2.

Moreover, the latching member 9 including the latching hook 11 at the tip of the latching member 9 may be provided in the relay 2 whereas a notch or an opening which is engaged with this latching member 9 may be provided in the base plate 6.

For the purpose of stably holding the relay 2, it is desirable to arrange the four latching members 9 respectively at four sides (edges) of the rectangular relay 2. However, as shown in FIG. 2, a connection terminal 21 that is connected to the external circuit(s) is provided on a wall of one end portion of the relay 2, so that the latching member 9 cannot be arranged on the wall of the one end portion of the relay 2. Therefore, in the example shown in FIG. 2, the three latching members 9 are arranged respectively at three spots (three sides) of each relay 2. That is, the latching members 9 include one latching member 9A provided on a wall of another end portion of the relay 2, and a pair of latching members 9B provided to face each other on both opposed surfaces of the one end portion of the relay 2 which are near the connection terminal 21. The two relays 2 are arranged in the postures reversed relative to each other as mentioned above. As shown in FIG. 2, the connection terminal 21 of one of the two relays 2 is located in an opposite side of a center line CL passing through (centers of) the two relays 2, from the connection terminal 21 of another of the two relays 2. That is, the center line CL is sandwiched between the connection terminals 21 of the two relays 2. In the same manner, the latching member 9A of the one of the two relays 2 faces in a direction opposite to a facing direction of the latching member 9A of the another of the two relays 2. By such an arrangement, even without providing the latching member 9 on the side (edge) of the relay 2 on which the connection terminal 21 is provided, the relays 2 can be stably connected with the base plate 6. As a result, the number of necessary latching members 9 can be reduced.

As mentioned above, the distance d between the relay 2 and the mounting surface 13 is set to be equal to the thickness of the base plate 6 so that the lower surface 6c of the base plate 6 is in contact with the mounting surface 13. Accordingly, the base plate 6 does not drop even if the latching member 9 is broken. Accordingly, a flapping that is caused due to a vehicle vibration and the like can be prevented.

Figure 5:
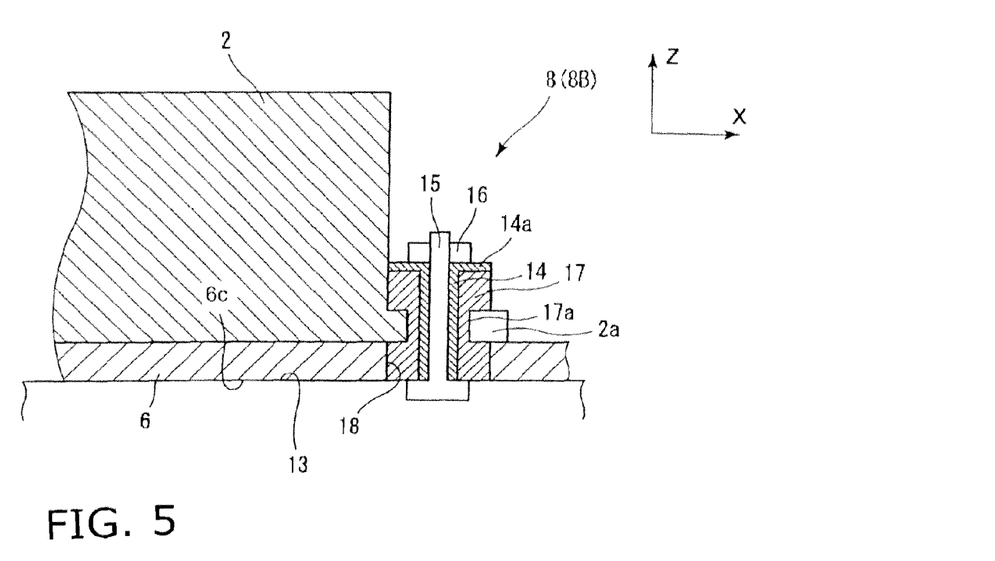
FIG. 5 A cross-sectional view of a part of the power shut-off unit, taken along a line C-C of FIG. 2.

FIGS. 4 and 5 are cross-sectional views as viewed from a lateral direction of the retaining member 8 in the first embodiment. The retaining member 8 includes a sleeve 14 and a buffer member (shock-absorbing material) 17. The sleeve 14 includes a flange 14a at one end of the sleeve 14. The buffer member 17 is formed in a cylindrical-tube shape and is attached to an outer circumference of the sleeve 14. The buffer member 17 is, for example, made of rubber or elastomer. The buffer member 17 includes a small-diameter portion 17a at an axially-central portion of the buffer member 17. The bracket portion 2a of the relay 2 is fitted into the small-diameter portion 17a. The retaining member 8 is fixed to the mounting surface 13 by a stud bolt 15 and a nut 16. The stud bolt 15 is fixed to the mounting surface 13 by welding or the like. The relay 2 is supported in a floating state through the buffer members 17 by the mounting surface 13. Therefore, when the relay 2 operates, a vibration of the relay 2 which is transmitted to the mounting surface 13 is reduced.

The base plate 6 is formed with through-holes 18 and cutouts 20 whose locations correspond respectively to the locations of the retaining members 8. The through-holes 18 and the cutouts 20 penetrate through the base plate 6 in the Z-axis direction. The buffer member 17 of each retaining member 8 passes through the through-hole 18 or the cutout 20 and reaches the mounting surface 13. In detail, as shown in FIG. 4, the cutout 20 corresponding to the retaining member 8A is formed in each of the pair of side edges 6b of the base plate 6 which are parallel to Y-axis. Moreover, as shown in FIG. 5, the through-holes 18 respectively corresponding to the retaining members 8B are formed in a middle portion of the base plate 6 with respect to a longitudinal direction of the base plate 6.

Since the base plate 6 is latched (or caught) through the latching members 9 by the relays 2, a projection-surface portion 19 (see FIG. 4) of the base plate 6 which is obtained by projecting the relay 2 on the base plate 6 in the Z-axis direction can be entirely formed as an opening of the base plate 6 so that the area of the base plate 6 is largely reduced. However, in this first embodiment, each of the through-holes 18 and the cutouts 20 has a minimum size necessary to pass the retaining member 8 therethrough in order to avoid an excessive reduction in strength and rigidity of the base plate 6.

Figure 6:
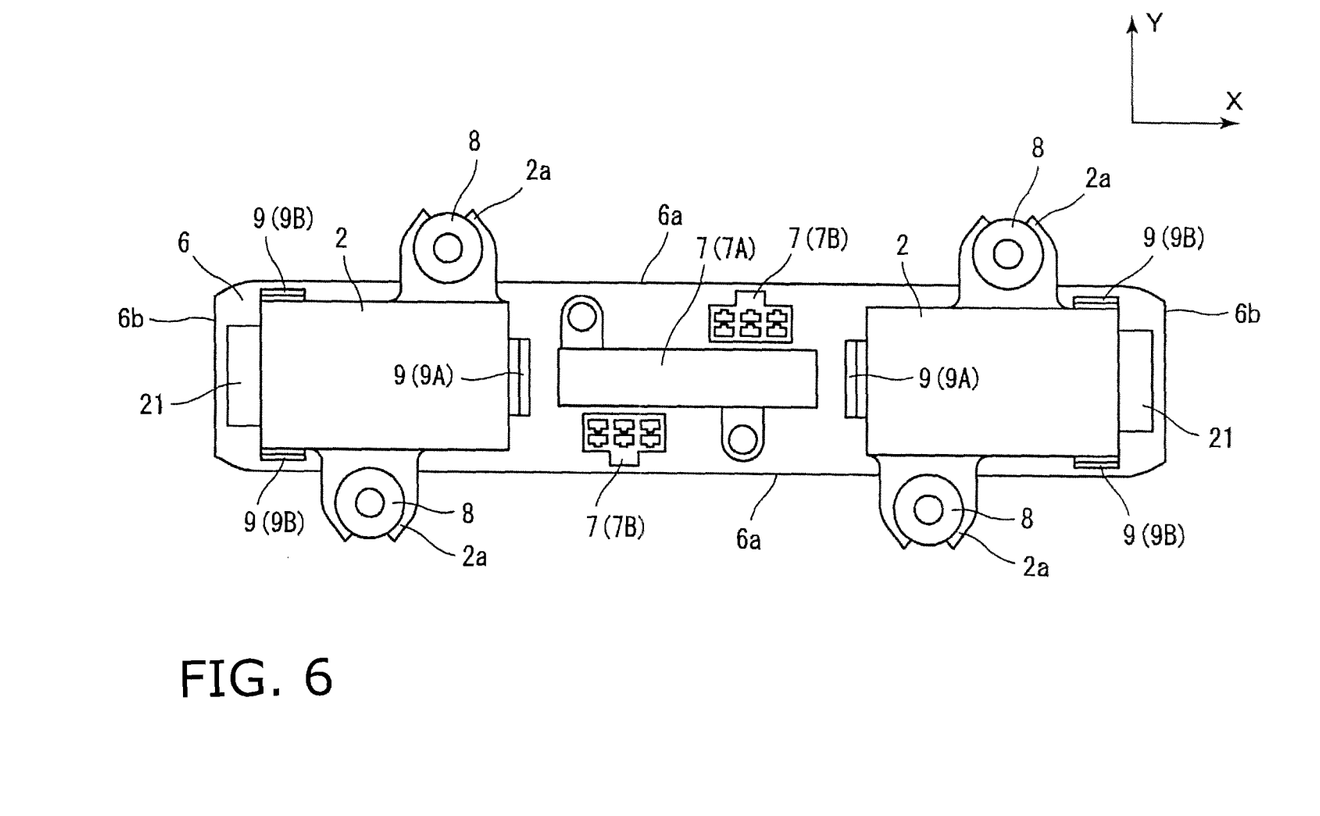
FIG. 6 A plan view showing a second embodiment of the power shut-off unit according to the present invention.

FIG. 6 is a view showing a second embodiment according to the present invention. In the second embodiment, the layout of the first embodiment is modified such that the relays 2 are supported through the retaining members 8 by the mounting surface 13 without forming the above-mentioned through-hole 18 or cutout 20 in the base plate 6.

A power shut-off unit 1 in the second embodiment includes two relays 2 in the same manner as in the first embodiment. These two relays 2 are arranged along the same straight line such that longitudinal directions of the two relays 2 accord with (are identical with) the X-axis direction. One of the two relays 2 faces in a direction opposite to a facing direction of another of the two relays 2. That is, the two relays 2 have postures opposite to each other so that the connection terminals 21 of the two relays 2 face in opposed outward directions. Between the two relays 2, the resistor 7A and the harness connector portions 7B are disposed as the auxiliary electronic components 7. (A longitudinal line of) The resistor 7A formed in a long-and-thin shape is arranged along the same straight line together with the relays 2.

In this second embodiment, the base plate 6 is formed in a rectangular shape having a minimum width (dimension in the Y-axis direction) necessary to dispose the two relays 2 in series with each other as mentioned above.

Each relay 2 includes a pair of bracket portions 2a in the same manner as in the first embodiment. Each bracket portion 2a holds the retaining member 8. Each bracket portion 2a protrudes outwardly from the straight side edge 6a of the base plate 6 which is parallel to X-axis. Accordingly, each retaining member 8 does not interfere with the side edge 6a of the base plate 6 and is located outside the base plate 6. Thus, each relay 2 is supported by the mounting surface 13 through the two retaining members 8 (8A and 8B) arranged outside the base plate 6.

The base plate 6 is connected with the relays 2 by the three latching members 9 provided at three spots, in the same manner as in the first embodiment. The latching member 9A located at one end portion of one of the two relays 2 is symmetrical to the latching member 9A located at one end portion of another of the two relays 2. Hence, the base plate 6 is reliably supported by the two relays 2.

In the second embodiment, the base plate 6 does not include the through-hole 18 or the cutout 20. Accordingly, the second embodiment is advantageous in strength of the base plate 6, so that the base plate 6 can be made thinner.

According to the present invention, alternatively, the structure in which the through-hole 18 or the cutout 20 is not provided as shown in FIG. 6 can be appropriately combined with the structure in which the through-hole 18 and/or the cutout 20 are provided as shown in FIG. 2.

Although the invention has been explained above with reference to the preferred embodiments of the invention, the invention is not limited to the embodiments described above. The above-described embodiments can be varied or modified as needed.

The invention claimed is:

1. A power shut-off unit comprising:
a relay connected to an external circuit;
a base plate formed in a tabular shape;
an auxiliary electronic component; and
a retaining member directly attached to the relay,
wherein the relay and the auxiliary electronic component are arranged above the base plate,
the relay is supported by a mounting surface of the power shut-off unit through the retaining member,
the relay is attached to the mounting surface by use of the retaining member such that a distance between the relay and the mounting surface is greater than or equal to a thickness of the base plate,
the base plate is not directly fixed to the mounting surface, and
the base plate is connected with the relay by a latching member and is located between the relay and the mounting surface.

2. The power shut-off unit according to claim 1, wherein the base plate includes a through-hole corresponding to a location of the retaining member, and the retaining member passes through the through-hole and reaches the mounting surface.

3. The power shut-off unit according to claim 1, wherein the base plate includes a cutout corresponding to a location of the retaining member, and
the retaining member passes through the cutout and reaches the mounting surface.

4. The power shut-off unit according to claim 1, wherein the power shut-off unit comprises at least two relays.

5. The power shut-off unit according to claim 4, wherein the auxiliary electronic component is disposed between adjacent two relays.

6. The power shut-off unit according to claim 4, wherein
at least one of the at least two relays is formed in a rectangular shape in a plan view,
the power shut-off unit comprises latching members provided at locations corresponding to three sides of the rectangular relay except a connection terminal of the rectangular relay, and
the at least two relays are adjacent and the adjacent two relays are arranged such that connection terminals of the adjacent two relays face in directions opposite to each other.

7. The power shut-off unit according to claim 1, wherein the latching member is formed in one of the base plate and the relay, and
the latching member includes a latching hook at a tip of the latching member, the latching hook engaging with another of the base plate and the relay.

8. The power shut-off unit according to claim 1, wherein the retaining member includes a buffer member holding the relay such that the relay is supported by the mounting surface through the buffer member.

9. The power shut-off unit according to claim 1, wherein a lower surface of the base plate is in contact with the mounting surface.

10. The power shut-off unit according to claim 1, wherein
the relay includes a bracket portion at a side surface of a case of the relay, the retaining member being attached to the bracket portion, and
the bracket portion and the retaining member protrude outwardly from a linear side edge of the base plate.

11. The power shut-off unit according to claim 1, wherein the retaining member includes
a cylindrical buffer member made of rubber or elastomer, and
a bolt passing through the buffer member and fixing the buffer member to the mounting surface,
bracket portions are formed respectively at both side surfaces of a case of the relay, and
each of the bracket portions is fitted to a small-diameter portion of the buffer member.

* * * * *